(12) United States Patent
Bradbrook

(10) Patent No.: US 8,324,746 B2
(45) Date of Patent: Dec. 4, 2012

(54) VARIABLE DRIVE GAS TURBINE ENGINE

(75) Inventor: Stephen J Bradbrook, Clevedon (GB)

(73) Assignee: Rolls-Royce PLC, London (GB)

( * ) Notice: Subject to any disclaimer, the term of this patent is extended or adjusted under 35 U.S.C. 154(b) by 419 days.

(21) Appl. No.: 12/693,784

(22) Filed: Jan. 26, 2010

(65) Prior Publication Data

US 2010/0219779 A1 Sep. 2, 2010

(30) Foreign Application Priority Data

Mar. 2, 2009 (GB) .................................. 0903423.2

(51) Int. Cl.
*F02C 7/36* (2006.01)
(52) U.S. Cl. ........................................................ 290/1 A
(58) Field of Classification Search .................... 290/1 A
See application file for complete search history.

(56) References Cited

U.S. PATENT DOCUMENTS

| | | | |
|---|---|---|---|
| 5,485,719 A * | 1/1996 | Wulf | 60/785 |
| 7,514,810 B2 * | 4/2009 | Kern et al. | 290/52 |
| 7,880,355 B2 * | 2/2011 | Qu et al. | 310/103 |
| 2006/0260323 A1 * | 11/2006 | Moulebhar | 60/793 |
| 2006/0272313 A1 * | 12/2006 | Eick et al. | 60/39.63 |
| 2007/0151258 A1 * | 7/2007 | Gaines et al. | 60/792 |
| 2009/0145998 A1 * | 6/2009 | Salyer | 244/17.23 |
| 2009/0289456 A1 * | 11/2009 | McLoughlin et al. | 290/46 |
| 2009/0322088 A1 * | 12/2009 | Dooley | 290/46 |
| 2010/0162719 A1 * | 7/2010 | Bowman et al. | 60/773 |
| 2010/0327109 A1 * | 12/2010 | Dooley et al. | 244/50 |

FOREIGN PATENT DOCUMENTS

| | | | |
|---|---|---|---|
| DE | 102007017332 A1 * | 10/2008 | |
| GB | 651157 A | 3/1951 | |
| GB | 695339 A | 8/1953 | |

OTHER PUBLICATIONS

Jun. 25, 2009 Search Report issued in British Application No. GB0903423.2.

* cited by examiner

*Primary Examiner* — Joseph Waks
(74) *Attorney, Agent, or Firm* — Oliff & Berridge, PLC

(57) ABSTRACT

A system and method for variable drive of a propeller or fan of a gas turbine engine. The gas turbine engine has a combustor and a turbine arranged to be driven by a combustion product from the combustor. The variable drive system comprises a primary shaft arranged for transmission of torque from said turbine to the propeller; an electric generator arranged to be driven by said turbine; and an electric motor arranged to be driven by the output of said generator. A clutch is mounted between the propeller and the primary rotor and is operable to mechanically disconnect the shaft from the propeller so that the propeller can be driven by any or any combination of the turbine and/or electric motor. The invention may be applied to a turboprop or turbofan engine having a gearing between the shaft and propeller or fan and may be particularly suited to unmanned aerial vehicle propulsion.

18 Claims, 2 Drawing Sheets

VARIABLE DRIVE GAS TURBINE ENGINE

The present invention relates to a variable drive or hybrid gas turbine engine and, more particularly, to a gas turbine engine in which torque can be selectively transmitted to a primary rotor by an electric motor.

The focus on fuel efficiency in the aerospace industry has lead to the provision of turbofan engines with low pressure fans of increasing size and greater bypass ratios. However practical considerations limit the maximum size of ducted fan which can be used. Accordingly, turboprop engines with larger unducted propellers remain an efficient solution for aircraft operating at relatively low altitude and speed.

The relatively large diameter of propellers requires a gearing arrangement to be provided between the low pressure turbine shaft and the propeller. The propeller operates most efficiently at a lower rotational speed than the low pressure turbine by which it is driven. Whilst such a gearing arrangement is most commonly associated with unducted turboprop engines, it has also been proposed to apply such a gearing arrangement to turbofan or ducted propeller gas turbine engines.

A problem with conventional gas turbine engines is that the low pressure turbine—or propeller turbine—can only operate efficiently within a narrow range of rotational speeds. The operational range of the propeller is thus correspondingly constrained if a conventional fixed ratio gearing is provided between the low pressure turbine and propeller. Whilst it is generally accepted practice to tailor engine design for maximum efficiency at a predetermined cruise conditions, it will likely be necessary for an aircraft to deviate from such conditions during its working life.

Variable speed gear box arrangements have been proposed in order to resolve this issue but such arrangements are mechanically complex and costly to implement and maintain.

It is an object of the present invention to provide a gas turbine engine which can operate efficiently under transient conditions or else across a range of cruise conditions.

According to a first aspect of the present invention, there is provided a drive system for a primary rotor of a gas turbine engine having a combustor and a turbine arranged to be driven by a combustion product from the combustor, the drive system comprising: a mechanical coupling arranged for transmission of torque from said turbine to said primary rotor; an electric generator arranged to be driven by said turbine and an electric motor arranged to be driven by the output of said generator for selective application of torque to the primary rotor; and, a clutch arranged in the force path between mechanical coupling and the primary rotor and selectively operable to mechanically disconnect said shaft from torque transmission with said primary rotor such that the primary rotor is driveable in use by any or any combination of the turbine and/or electric motor.

The mechanical coupling may comprise a primary shaft. The system may comprise a gearing arrangement for mechanical connection of said primary shaft to said primary rotor.

The clutch may be mounted to allow selective engagement of the primary shaft with the gearing arrangement. The electric motor may have an output shaft which engages said gearing arrangement for the transmission of torque therebetween.

The motor output shaft may have a gear mounted thereto or associated therewith. The motor output shaft gear may engage a gear associated with the primary rotor.

In one embodiment, the generator comprises an input shaft which engages a gear associated with the primary shaft so as to allow transmission of torque between the primary shaft and generator. The generator input shaft may be mounted for permanent engagement with said primary shaft gear.

According to a preferred embodiment, the system comprises control means connected to said generator and said motor and arranged to control the supply of power to said motor from said generator. Preferably, the control means is arranged to control operation said clutch to connect or disconnect the primary shaft from the primary rotor.

The control means may be arranged to divert power from said generator to said motor when the clutch is operative to disconnect the primary shaft from the primary rotor, such that the primary rotor is driven primarily by the motor. The control means may be arranged to divert power from said generator to the motor based upon determination of a operating condition of the primary rotor.

The motor may be driven by the primary rotor when the clutch is engaged so as to operate as a generator when the primary rotor is driven by the turbine via the primary shaft. Control means may divert supplementary power generated by said motor and/or generator to an airframe power system.

The gas turbine engine may further comprise a starter motor operable to drive a second shaft upon startup of the engine. The starter motor may operate as a further electrical generator during normal operation of the gas turbine engine. The control means may divert power from the starter motor acting as a further generator to the motor or an airframe power system based upon an operating condition of the primary rotor.

According to a further aspect of the present invention, there is provided a gas turbine engine comprising a combustor, a turbine arranged to be driven by gas from the combustor, a primary rotor for providing propulsive thrust derived from the turbine, and a gearing arrangement connected in a force path between the turbine and the primary rotor, the gas turbine engine further comprising a generator arranged to be driven by said turbine, an electric motor arranged to be selectively driven by the output of said generator and a coupling arranged for selective connection of the turbine to the primary rotor via the gearing arrangement such that the primary rotor is selectively driveable by any or any combination of the turbine and the electric motor.

The primary rotor may be a propeller or fan.

According to a further aspect of the present invention, there is provided a data carrier comprising machine readable instructions for operation of a drive system for a gas turbine engine in accordance with the first aspect of the present invention.

The machine readable instructions may control diversion of power from said generator to said motor dependent upon one or more operating conditions of the primary rotor. The one or more operating conditions of the primary rotor may comprise the rotational speed and/or torque applied to the primary rotor.

According to a fourth aspect of the present invention, there is provided a method of operating a gas turbine engine having a combustor, a turbine arranged to be driven by combustion products from the combustor, a primary rotor for providing propulsive thrust derived from the turbine, a generator arranged to be driven by said turbine, an electric motor arranged to be selectively driven by the output of said generator and a clutch arranged for selective connection of the turbine to the primary rotor, the method comprising: monitoring an operating condition of said primary rotor; determining a desired operating condition of said primary rotor; operating said clutch to mechanically disconnect the primary rotor from the turbine, and diverting power from the generator to said motor to drive the primary rotor in accordance with said desired operating condition.

Any of the optional features described above in relation to one aspect of the invention may be applied to any other aspect of the invention.

The invention or any embodiment thereof may find particular application in the field of unmanned aerial vehicle (UAV) propulsion. The invention may have a beneficial impact on the range attainable for such vehicles.

Practicable embodiments of the present invention are described in further detail below by way of example with reference to the accompanying drawings, of which:

The word 'clutch' as used herein is intended as a reference to a coupling between two or more rotating members, which is selectively operable to allow transfer of torque there-between.

Figure 1:
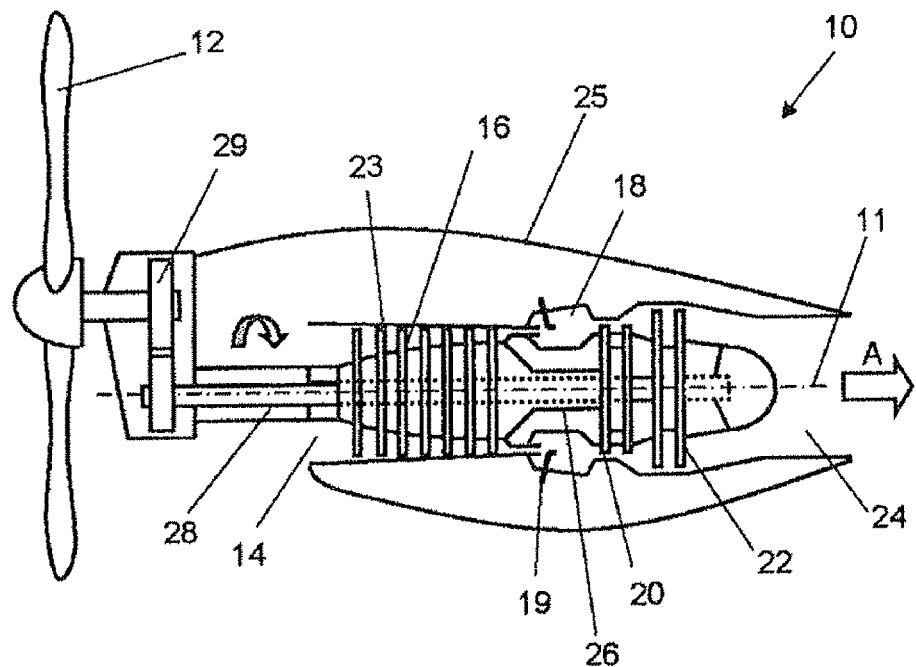
FIG. 1 shows a longitudinal section of a conventional gas turbine engine.

With reference to FIG. 1, a gas turbine engine is generally indicated at 10 of the type conventionally referred to as a turboprop. The gas turbine engine 10 has a principal and rotational axis 11. The engine 10 comprises, in flow series, a propeller 12, an engine air intake 14, a compressor 16, combustion equipment 18, a high-pressure turbine 20, a low-pressure turbine 22, and a core engine exhaust 24, A casing 23 and nacelles 25 generally surround the core engine and define the shape of intake 14. It will be appreciated by those skilled in the art that the various possible mounting arrangements for turboprop engines on aircraft result in various possible forms of nacelle and intake profiles.

The gas turbine engine 10 works in a conventional manner so that air entering the intake 14 is compressed by the rotating blades of compressor 14 prior to entering the combustion equipment 18.

The axial compressor 14 comprises a plurality of discs mounted to a drum, each disc having blades mounted thereon in a conventional manner. Each compressor disk may have associated therewith a circumferential set of fixed stators or vanes depending inwardly from the casing 23 so as to provide a plurality of axially aligned compressor stages.

The compressed air enters the combustion equipment where it is mixed with fuel emanating from fuel injectors 19 and the mixture combusted. Upon exit from the combustion equipment, the resultant hot combustion products expand and thereby drive the high and low-pressure turbines 20 and 22 before being exiting the core engine through the exhaust 24 in the direction of arrow A.

The high pressure turbine 20 is connected to and thereby drives the high pressure compressor 16 by interconnecting shaft 26. The low pressure turbine 22 is connected to, and thereby drives, the propeller 12 via shaft 28. A gearing arrangement 29 is connected in the force path between the shaft 28 and the propeller 12 in order to drive the propeller at a suitable rotational speed to provide propulsive thrust for an aircraft. The core engine exhaust 24 comprises a nozzle formation to provide additional propulsive thrust.

The operation of the turboprop engine can in many ways be likened to that of a two-shaft turbofan engine save that the propeller 12 is generally larger than the fan of a turbofan engine and is not ducted. The present invention represents a modification to gas turbine engines and/or associated drive systems according to the prior art and any of the features described above may also be attributed to embodiments of the present invention.

Figure 2:
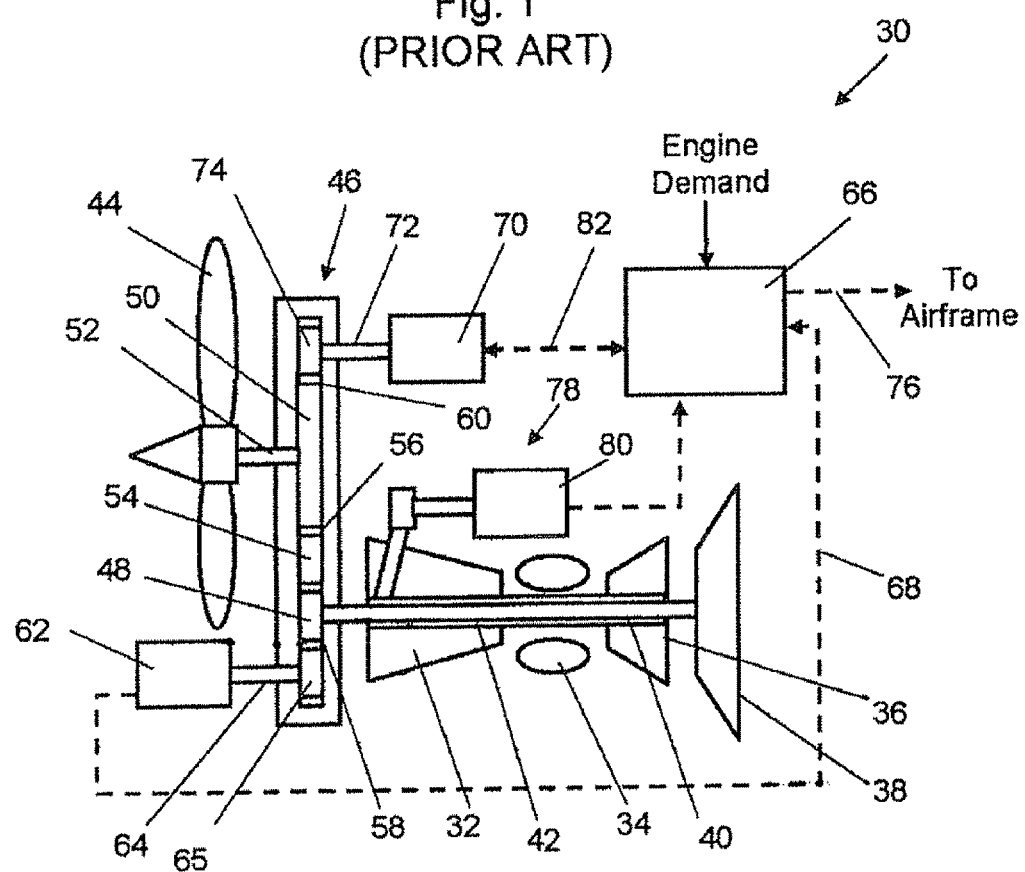
FIG. 2 shows a schematic sectional view of a turboprop gas turbine engine according to one embodiment of the present invention; and, FIG. 3 shows a schematic sectional view of a ducted turbofan gas turbine engine according to a second embodiment of the present invention.

A schematic of an arrangement according to one embodiment of the present invention is shown in FIG. 2 and described below. The arrangement of the present invention may operate in a manner which is fundamentally the same as the gas turbine engine of FIG. 1, save for the differences described below.

In the embodiment of FIG. 2, the engine system 30 comprises a core engine compressor 32 arranged to compress air into combustion chambers 34 such that the combustion products drive axially-aligned high 36 and low 38 pressure turbines. The high pressure turbine 36 is connected to the compressor 32 by shaft 40 for the direct transmission of torque thereto. Thus the high pressure turbine 36 and compressor 32 rotate in use at the same speed.

The shaft 40 is hollow and the low pressure turbine 38 is mounted on shaft 42 which passes through the bore of hollow shaft 40. The shaft 40 is in part generally tubular in shape and is axially aligned in a concentric fashion about shaft 42. The turbine 38 provides torque for driving a propeller 44 via shaft 42. However, unlike the connection between the high pressure turbine 36 and compressor 32, the shaft 42 is not directly connected to the propeller 44, such that the angular velocity of the propeller in use can differ from that of the low pressure turbine 38.

In an alternative embodiment, conventionally referred to as a rear drive arrangement, the propeller may be mounted on the opposing side of turbine 38 via a different shaft arrangement which need not by necessity require the concentric hollow shaft arrangement shown in FIG. 2.

The propeller is selectively connected to the low pressure turbine shaft 42 by a variable drive arrangement 46. The variable drive arrangement 46 comprises a first gear 48 mounted on shaft 42 and a second gear 50 arranged to drive the propeller 44 by a short connecting shaft 52. Accordingly the second gear 50 directly drives the propeller at an angular velocity ratio of 1:1.

The diameter of the second gear wheel 50 is greater than that of gear wheel 48 such that, when torque is mechanically communicated there-between, the second gear wheel 50—and hence the propeller—rotates more slowly than the turbine shaft 42. This represents one simple gearing arrangement and other forms of known gearing arrangement may provide suitable alternatives provided they allow for a suitable reduction in rotational speed between the turbine 38 and propeller 44.

A clutch device, shown generally at 54, is arranged to allow selective transmission of torque between gears 48 and 50. In this embodiment, the clutch 54 takes the form of a further gear which is selectively locatable between the gears 48 and 50 such that the teeth 56 of the clutch gear engage with both the teeth 58 of gear 48 and the teeth 60 of gear 50. When the clutch engages both gears 48 and 50 in this manner it can be considered to be in an engaged position. The clutch is moveable out of engagement with either or both of the gears 48 and 50 into a disengaged position (not shown) such that torque from the shaft 42 is no longer transmitted to gear 50 via the clutch.

However various forms of conventional clutch are envisaged as being useable within a system according to the present invention, including fluidic or mechanical clutches.

The turbine shaft 42 is further connected to an electrical generator 62 by generator shaft 64. In this embodiment, a gear 65 is mounted on generator shaft 64 and located in engagement with the first gear 48 such that the teeth of said respective gears mesh. The rotor of the generator 62 thus rotates about an axis substantially parallel to the axis of rotation of the shaft 42. It is to be noted that the generator is thus continually or permanently coupled to the shaft 42 for the transfer of torque there-between.

It will be appreciated that other means of transferring torque to a generator are known in the art and could usefully be employed dependent on space constraints, such as for example a radial drive which may employ a step-aside gearbox for mounting of the generator a distance radially from the shaft 42, for example within the nacelles. A belt drive system is also envisaged as a possible alternative to the meshing gear arrangement described above.

As a further advancement of the present invention, the generator 62 may be mounted directly to the turbine and may take the form of an integrated generator, for which windings are formed around a turbine shaft in which permanent magnets are mounted.

The use of a gearbox between the shaft 42 and generator allows the generator rotor to rotate at a suitable angular velocity which need not match the rotational speed of the shaft 42.

The generator 62 is electrically connected to a power control unit 66 via link 68.

The system 30 further comprises an electric motor 70 which is arranged for torque transmission with the second gear 50 via motor shaft 72. The motor shaft 72 has mounted thereon a gear 74 which engages with gear 50 such that the teeth of said respective gears mesh. The motor 70 is connected to power control unit 66. Accordingly the motor 70 is indirectly connectable to the generator 62 via the power control unit 66.

In this embodiment, the motor comprises a brushless variable-speed DC motor. However there are numerous options for the motor 70 which may comprise a DC or AC control as will be understood by a person skilled in the art. The speed of the motor may accordingly be controlled using an AC or DC control signal from the power control unit 66, which may allow for a variable frequency drive such as by way of, for example, pulse width modulation.

The power control unit 66 is also electrically connected to the airframe power circuit of an aircraft on which the engine system 30 is mounted for use via connection 76. The aircraft may take the form of a UAV or else a passenger aircraft.

The gearing arrangement connecting the turbine shaft 42 with the generator 62; the propeller 44 with the motor 70; and, the selective connective between the propeller gear 50 and shaft 42 via clutch 54 can beneficially be provided within a single gearbox. The clutch allows disengagement of the turbine shaft 42 and generator 62 from the propeller and motor 70 as will be described in further detail below.

For the avoidance of doubt, there is also shown a conventional starter motor/generator arrangement 78. Such a starter motor/generator arrangement is well known and comprises a motor 80 which is connected to the compressor shaft 40 of a gas turbine engine for the application of torque thereto upon start-up of the engine. Once the engine is operational, the starter motor may be driven by the high pressure turbine via shaft 40 so as to operate as a generator in order to provide electrical power to the airframe.

The power control unit 66 of the present invention is provided with machine-readable instructions comprising control logic for determining the manner in which power is to be distributed about the system. The power control unit 66 also comprises means for diverting power between the motor 70 and airframe power circuit. The power control unit 66 may receive data from one or more engine sensors, said data being representative of engine operating conditions and/or performance. The power control unit may also be connected to further onboard control systems such that the power control unit is arranged to receive signals indicative of a demand placed upon the engine. Such a demand may comprise information indicative of a desired engine speed, aircraft velocity or other desired condition.

The power control unit 66 is arranged to process the received signals and to determine a desirous operating condition of the propeller in accordance with the control logic. The power control unit implements the resultant operating condition by directing electrical power to or from the motor 70 as required. In addition, the power control unit is connected to clutch 54 actuation means so as to control whether the clutch is in its engaged or disengaged position.

The power control unit will typically prioritize the propulsive demands of the engine, followed by the operational efficiency of the engine. Any surplus electrical power generated by the system 30 is diverted to the airframe via connection 76.

During normal operating conditions, the power required for driving the propeller will typically decrease as the altitude of an aircraft increases. Accordingly the present invention may allow the rotational speed of the propeller to be optimized for varying flight conditions. With a conventional gas turbine engine the degree of available variation in propeller speed for a given power requirement is typically in the region of 10% and may be as much as 15-20%. However it is envisaged by the present invention that greater efficiency for a given power requirement can be achieved at further reduced propeller speeds. In this regard the system of the present invention may allow for a variation in propeller speed of greater than 20% up to approximately 50% or potentially as great as 60 or 70% for a given power requirement.

Furthermore, this can be achieved whilst the engine is operating at a predetermined, substantially steady-state, operating condition at which optimal fuel efficiency can be achieved. Thus the engine running efficiency is not compromised but instead the direct mechanical drive from turbine 38 via propeller drive shaft 42 is complemented by, or swapped for, a secondary electrical drive, where increased efficiency can be achieved dependent on operating conditionals. A propeller speed can thus be selected which best matches the aircraft altitude and velocity.

The increased variation offered by the present invention may also provide the added benefit that it can allow for a larger flight envelope for a given engine.

The operation of the system according to the present invention is described in further detail below with reference to three primary operational modes.

Mode 1

In this mode of operation the clutch 54 is engaged and the propeller is driven primarily by the low pressure turbine 38 via shaft 42. The generator 62 is connected to shaft 42 via gearing 65 and provides electrical power to the power control unit 66 via line 68.

The power control unit 66 assesses that the engine demand is being met and diverts the surplus electrical power to the airframe for supply to onboard systems.

The motor 70 is not driven by power from the power control unit 66 and thus the motor output shaft 72 is driven by the propeller 44 via gear 50. Accordingly the motor 70 functions as a generator in this mode of operation under the power of the turbine 38 via the propeller gearbox and power generated thereby is fed to the power control unit 66 by link 82. This surplus power is also fed to the airframe for use onboard. The optional starter motor 80, if fitted, may function in this mode as a generator in a conventional manner and the power supplied thereby can also be diverted by the power controller for use by the airframe.

The choice of the source of electrical power by the power control unit can be made to provide the optimum operating conditions for the gas turbine. For example, conditions for optimal compressor stability and/or efficiency can be selected. The propeller speed is constrained by the operating range of the propeller turbine and/or any mechanical constraints of the transmission systems, such as the propeller turbine shaft.

Mode 2

This mode is similar to mode 1, except that the power control unit 66 determines that additional power to the propeller is required and diverts electrical power generated by the starter motor 80, when operating as a generator, to provide power to motor 70 via link 82. The motor 70 thus operates in motor mode and provides mechanical power to the propeller 44 to supplement the torque supplied via clutch 54. The power to drive the propeller is therefore shared between the turbine 38 and the high pressure turbine 36 via shaft 40 and generator/motor 80.

By varying the split of power between the two spools of the engine in this manner, it is possible to alter the operating conditions of the engine turbo-machinery and hence achieve the optimum balance between surge margin and efficiency.

Mode 3

In this mode, the clutch 54 is disengaged and the output torque of turbine 38 is used solely to drive generator 62. The power controller directs power from the generator 62 and starter motor 80—in generator mode—to motor 70 which drives the propeller via the gearing arrangement. The speed of the propeller can be varied across a relatively large speed range due to the wide operating range of the motor 70 relative to the turbine 38.

For example, the propeller speed may be substantially reduced relative to mode 1 in order to improve the efficiency of the propeller. The speed of the propeller turbine 38 and generator 62 can be varied to optimise the magnitude and efficiency of electrical power generation. For example, the gearing 65 can be designed such that the rotational speed of generator shaft 62 is relatively high such that a small and lightweight generator can be utilised. The relative gearing ratios can also be used to ensure that the propeller turbine is operating at an optimal, or close-to-optimal, efficiency.

As in mode 1, any surplus electrical power can be diverted to the airframe via link 76.

The ability to operate the hybrid engine in several differing modes allows the various components to be sized for particular engine operating conditions. For example, mode 3 could be confined to operating conditions where only low levels of power are required by the propeller, e.g. at high altitude. In this way the size and weight of the generator/motor 70 may be minimised.

The electrical power control unit may contain sophisticated control algorithms which ensure that the choice of operating mode and the use of the available electrical generators is optimised at a particular engine operating condition. Whilst three different primary operating modes have been identified above, the power control unit has the ability to control the variable drive of the motor 70 such that a range of operation is possible within each mode.

Within a UAV for example, the switching between modes of operation may be predetermined according to a predetermined flight plan or mission. The switching between modes may thus be triggered at predefined altitudes, timings or in reliance on one or more other external variables.

However it is envisaged that ability to adapt to varying internal or external conditions will be useful to the operation of the aircraft. Accordingly the sensing of operating conditions and the communication of those sensed conditions in order to adaptively determine the optimal mode of operation for a given time period will typically be undertaken. The choice of mode or a mode change decision may be taken by the power control unit onboard the aircraft or else may be determined by an alternative processing means and communicated to the power control unit for implementation of a desired operational mode.

The sensed conditions may feed into an adaptive feedback loop for a predetermined operation mode sequence. Alternatively, in the absence of a predetermined operation mode sequence, the power control unit may maintain a current mode of operation until the sensed conditions determine that a more efficient mode of operation can be employed within acceptable operational parameters. In any method of operation, the aircraft would typically require Mode 1 for take-off and thus it would be the default selection upon a=start-up.

Whilst the above embodiment is described with a degree of particularity as having a single clutch 54 between the turbine shaft and propeller gear 50, in alternative embodiments, an additional clutch could be provided for example in the force path between the turbine shaft 42 and generator shaft 64 such that the generator 62 can be engaged and disengaged with the turbine shaft selectively under the control of power control unit 66. Additionally or alternatively, a clutch could be provided in the force path between the motor 70 and propeller 44 such that the motor 70 can be engaged and disengaged with the turbine shaft selectively under the control of power control unit 66.

In another embodiment the propeller gearing could be permanently connected to the low pressure turbine shaft 42 and a clutch could instead be provided in the force path between the turbine shaft 42 and generator shaft 64. Whilst such an embodiment would reduce the potential operational benefits associated with the ability to mechanically disengage the propeller from the turbine shaft 42, it may allow increased operational flexibility over conventional drive systems by allowing selective connection of the generator 62 to the shaft 42.

One advantage which may be attributed to the system according to the present invention is that it avoids the need for storage of electrical charge using a battery, super-capacitor or the like as part of the propulsion system and the possible energy losses associated therewith.

The gearing arrangement and the offset of the propeller from the core engine axis 11 as shown in FIGS. 1 and 2 provides a suitable location for connection of the generator and motor to the propeller transmission arrangement. However it is also possible to incorporate a suitable gearing arrangement to a fan or propeller which is mounted in axial alignment with the engine axis as described below in relation to FIG. 3.

Figure 3:
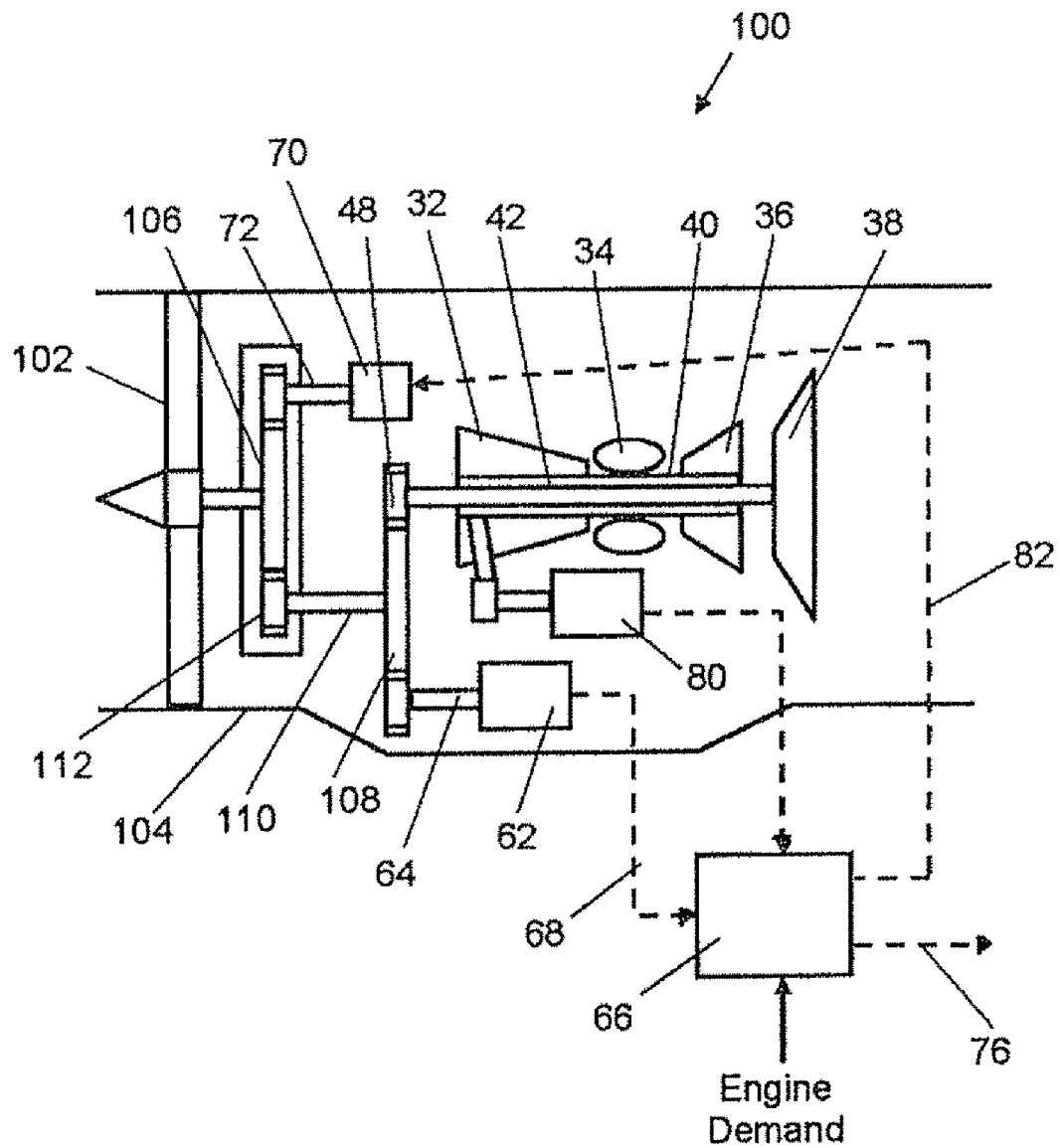

FIG. 3 shows a schematic of the application of the present invention to a geared turbofan system 100. It is known that conventional turbofan engines may have either a two or three engine spool arrangement. A two-spool arrangement is shown here which is generally similar to the arrangement of FIG. 2 and corresponding parts have been given corresponding numerals for conciseness. However the actual geometry of those parts for a turbofan engine design may differ in reality from those of a turboprop engine.

For a three spool engine, high, intermediate and low pressure turbines are provided and drive a high pressure compressor, an intermediate pressure compressor and a low pressure compressor or fan respectively via suitable interconnecting shafts in axial alignment. A gearing, clutch and power control system as shown in FIG. 3 may equally be applied to the low pressure turbine shaft of a three-shaft gas turbine engine.

The operation of the components shown in FIG. 3 is substantially the same as that described in FIG. 2 and any features, advantages and/or variations described in relation to the embodiment of FIG. 2 may equally be applied to the embodiment of FIG. 3. However the fan 102 of FIG. 3 is ducted in that it is surrounded by and contained within nacelles 104. A proportion of the air from the fan is diverted through the core engine and the remainder passes through a bypass duct (not shown) in a conventional manner.

The fan 102 is mounted in axial alignment with the core engine axis 11. Accordingly the turbine shaft gear 48 is axially spaced form the fan gear 106 and the two gears are selectively connected by an interconnecting gear 108 and shaft 110 arrangement. The interconnecting gear is mounted on interconnecting shaft 110 and engages with gear 48 on shaft 42. The interconnecting shaft 110 is mounted for rotation about an axis generally parallel with the engine axis 11 and extends between the gear 108 and clutch 112. The clutch 112 is arranged to be selectively engaged with, or disengaged from, the fan gear 106 in a manner similar to clutch 54 described above.

The fan gear 106 may be similar to propeller gear 50 in FIG. 2 save that the ratio of diameters between gear 48 and fan gear 106 may be smaller than that of FIG. 2 so as to provide for faster rotational speeds of the fan 102 compared to the propeller 44.

Such an arrangement allows for the axial alignment of the fan to be maintained whilst also providing for a gearing and clutch arrangement by which the fan can be mechanically disconnected from the turbine shaft 42 under the control of power control unit 66.

In addition to the above-described embodiments, it will be appreciate that the present invention may be applied to other types of gas turbine engine, such as, for example, a gas turbine engine having contra-rotating propellers or else a ducted propeller.

The invention claimed is:

1. A drive system for a primary rotor of a gas turbine engine having a combustor and a turbine arranged to be driven by a combustion product from the combustor, the drive system comprising:
   a primary shaft arranged for transmission of torque from said turbine to said primary rotor;
   an electric generator arranged to be driven by said turbine and an electric motor arranged to be driven by the output of said generator for selective application of torque to the primary rotor; and,
   a clutch arranged in the force path between the primary shaft and the primary rotor and selectively operable to mechanically disconnect said shaft from torque transmission with said primary rotor such that the primary rotor is driveable in use by any or any combination of the turbine and/or electric motor.

2. A drive system according to claim 1, comprising a gearing arrangement for mechanical connection of said primary shaft to said primary rotor, wherein the clutch is mounted to allow selective engagement of the primary shaft with the gearing arrangement.

3. A drive system according to claim 2, wherein the electric motor has an output rotor shaft which engages said gearing arrangement for the transmission of torque there-between.

4. A drive system according to claim 3, wherein the electric motor output shaft engages a gear associated with the primary rotor.

5. A drive system according to claim 2, wherein the generator comprises an input shaft which engages a gear associated with the primary shaft for transmission of torque between the primary shaft and generator.

6. A drive system according to claim 5, wherein the generator input shaft is mounted for continuous engagement with said primary shaft gear such that said generator is not disconnected by operation of said clutch.

7. A drive system according to claim 1, further comprising control means connected to said generator and said motor and arranged to control the supply of power to said motor from said generator.

8. A drive system according to claim 7, wherein the control means is arranged to control operation said clutch to connect or disconnect the primary shaft from the primary rotor.

9. A drive system according to claim 7, wherein the control means is arranged to divert power from said generator to said motor when the clutch is operative to disconnect the primary shaft from the primary rotor, such that the primary rotor is driven primarily by the motor.

10. A drive system according to claim 7, wherein the motor is operable as a generator when the primary rotor is driven by the turbine via the primary shaft, and the control means is arranged to divert supplementary power generated by said motor to an airframe power system.

11. A drive system according to claim 7, the gas turbine engine further comprising a second turbine connected to a compressor by a second shaft and a starter motor operatively connected to said second shaft, wherein the starter motor is driven by said second shaft so as to operate as an electrical generator during operation of the gas turbine engine and the control means is arranged to divert power to the motor or an airframe power system based upon the operating condition of the primary rotor.

12. A gas turbine engine comprising a drive system according to claim 1.

13. A gas turbine engine according to claim 12, wherein the primary rotor comprises a propeller.

14. A data carrier comprising machine readable instructions for operation of a controller for a gas turbine engine having a combustor, a turbine arranged to be driven by gas from the combustor, a primary rotor for providing propulsive thrust derived from the turbine, a generator arranged to be driven by said turbine, an electric motor arranged to be selectively driven by the output of said generator and a clutch arranged for selective connection of the turbine to the primary rotor,
   wherein the machine readable instructions control said controller to selectively operate said clutch to connect or disconnect the primary rotor from the turbine in dependence upon one or more operating conditions of the primary rotor, such that the primary rotor is selectively driveable by any or any combination of the turbine and the electric motor.

15. A data carrier according to claim 14, wherein the machine readable instructions control said controller to divert power from said generator to said motor in dependence upon one or more operating conditions of the primary rotor.

16. A data carrier according to claim 14, wherein the one or more operating conditions of the primary rotor comprises rotational speed and/or torque applied to the primary rotor.

17. A method of operating a gas turbine engine having a combustor, a turbine arranged to be driven by combustion products from the combustor, a primary rotor for providing propulsive thrust derived from the turbine, a generator arranged to be driven by said turbine, an electric motor arranged to be selectively driven by the output of said generator and a clutch arranged for selective connection of the turbine to the primary rotor, the method comprising:

monitoring an operating condition of said primary rotor determining a desired operating condition of said primary rotor operating said clutch to mechanically disconnect the primary rotor from the turbine, and diverting power from the generator to said motor to drive the primary rotor in accordance with said desired operating condition.

18. A method according to claim 17, wherein the operating condition comprises the rotational speed of the primary rotor, further comprising varying the speed of the motor to effect a desired rotational speed.

* * * * *